Figure 1:
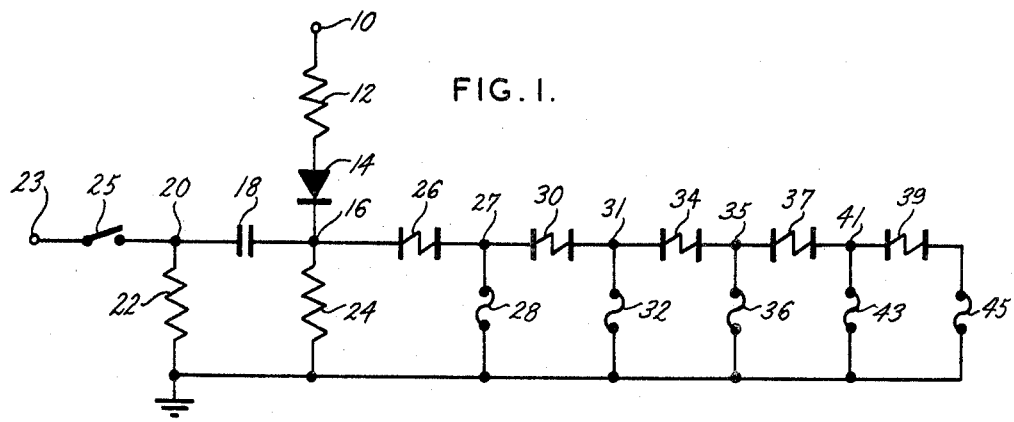

3,417,259
CONTROL SYSTEMS FOR SEQUENTIALLY ACTUATING A PLURALITY OF LOADS
Yasuto D. Nozawa, St. Ann, and Roger M. Nasser, Vinita Park, Mo., assignors to Conductron Corporation, St. Charles, Mo., a corporation of Delaware
Filed Oct. 26, 1966, Ser. No. 589,560
26 Claims. (Cl. 307—108)

This invention relates to improvements in control systems. More particularly, this invention relates to improvements in control systems that can sequentially actuate a plurality of loads.

It is, therefore, an object of the present invention to provide an improved control system which can sequentially actuate a plurality of loads.

It is frequently desirable to actuate a plurality of loads sequentially. For example, in the firing of pyrotechnic devices, it is frequently desirable to fire those pyrotechnic devices sequentially rather than simultaneously. In recognition of that fact, a number of control systems have been proposed which could sequentially actuate a plurality of loads. The control system provided by the present invention is superior to any prior control system for sequentially actuating a plurality of loads; because it needs only a small amount of energy to control the actuation of a plurality of loads that require appreciable amounts of power to actuate them, it can provide different time intervals between the actuations of the sequentially-actuated loads, and it has a "memory" so it can actuate the next-succeeding load if the power to that control system is restored after that power has been "off" for an indefinite length of time. It is, therefore, an object of the present invention to provide a control system that can sequentially actuate a plurality of loads, that needs only a small amount of energy to control the actuation of a plurality of loads which require appreciable amounts of power to actuate them, that can vary the time intervals between the actuations of the sequentially-actuated loads, and that has a "memory" so it can actuate the next-succeeding load if the power is restored after that power has been "off" for an indefinite length of time.

The control system provided by the present invention causes each voltage pulse to actuate just a predetermined number of voltage actuated switches. This is important, because it enables variations in the lengths of the time intervals between the voltage pulses to vary the time intervals between the actuations of the sequentially-actuated loads. It is, therefore, an object of the present invention to provide a control system that can sequentially actuate a plurality of loads and that causes each voltage pulse to actuate just a predetermined number of voltage actuated switches.

In one preferred embodiment of control system provided by the present invention, a capacitor is connected to a source of power to store energy in that capacitor and is connected to a series-connected voltage actuated switch and load to enable that capacitor to apply a voltage to that series-connected voltage actuated switch and load, and a voltage pulse is selectively added to the voltage across that capacitor to actuate that voltage actuated switch and thereby permit energy from that source of power and from that capacitor to actuate that load. The voltage pulse need not supply much energy, because that voltage pulse will merely coact with the voltage across the capacitor to actuate the voltage actuated switch; and the energy needed to actuate that load will be supplied by the capacitor and the source of power. It is, therefore, an object of the present invention to provide a control system that can sequentially actuate a plurality of loads, that connects a capacitor to a source of power to store energy in that capacitor, that connects that capacitor to a series-connected voltage actuated switch and load to enable that capacitor to apply a voltage to that series-connected voltage actuated switch and load, and that selectively adds a voltage pulse to the voltage across that capacitor to actuate that voltage actuated switch and thereby permit energy from that source of power and from that capacitor to actuate that load.

Other and further objects and advantages of the present invention should become apparent from an examination of the drawing and accompanying description.

In the drawing and accompanying description three preferred embodiments of the present invention are shown and described but it is to be understood that the drawing and accompanying description are for the purpose of illustration only and do not limit the invention and that the invention will be defined by the appended claims.

Figure 2:
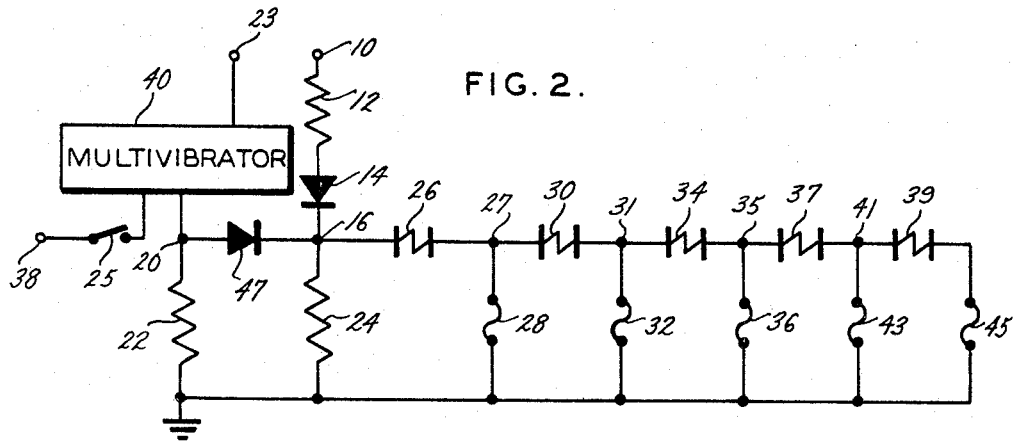
Figure 3:
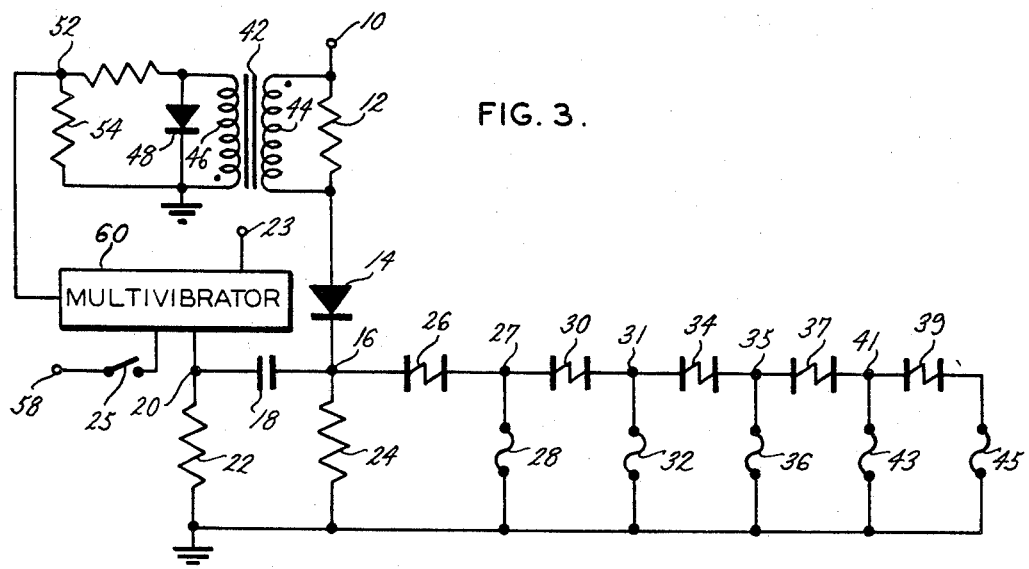

In the drawing, FIG. 1 is a schematic diagram of one preferred embodiment of control system that is made in accordance with the principles and teachings of the present invention, FIG. 2 is a schematic diagram of a second preferred embodiment of that control system, and FIG. 3 is a schematic diagram of a third preferred embodiment of that control system.

Referring to the drawing in detail, the numeral 10 denotes a terminal which is connectable to a first source of power. A resistor 12, a diode 14, and a junction 16 connect that terminal to the right-hand terminal of a capacitor 18; and a junction 20 and a resistor 22 connect the left-hand terminal of that capacitor to ground. A resistor 24 extends between the junction 16 and ground.

The numeral 26 denotes a voltage actuated switch that normally has a high impedance but that can respond to a predetermined voltage to become actuated and thereby change to a low impedance. An electrolytic capacitor is one such voltage actuated switch, but other voltage actuated switches could be used. Any voltage actuated switch that is used must be able to respond to a predetermined voltage to experience an irreversible change from a high impedance state to a low impedance state. The voltage actuated switch 26 is connected in series with a load 28 by a junction 27; and that load can be a squib, a fuse, or other triggering device for a pyrotechnic device. That load will normally have a low impedance, but it will respond to a predetermined amount of current flowing therethrough to experience an irreversible change from a low impedance state to a high impedance state.

The numerals 30, 34, 37, and 39 denote additional voltage actuated switches which are similar to the voltage actuated switch 26; and the numerals 32, 36, 43 and 45 denote additional loads which are similar to the load 28. A junction 31 connects the voltage actuated switch 30 in series with the load 32, a junction 35 connects the voltage actuated switch 34 in series with the load 36, a junction 41 connects the voltage actuated switch 37 in series with the load 43, and the voltage actuated switch 39 is connected in series with the load 45. Any desired number of additional voltage actuated switches and loads can be connected in series in the manner in which the voltage actuated switches 26, 30, 34, 37 and 39 and the loads 28, 32, 36, 43 and 45 are connected; as long as the total resistance of the actuated voltage actuated switches and of resistor 12 and diode 16 does not limit the current passing through those voltage actuated switches, that resistor and that diode to a value which is too small to initiate and complete the actuation of the loads connected in series with those voltage actuated switches. In actual practice, more than five voltage actuated switches and more than five loads will usually be used; and the voltage actuated switches and loads in the drawing are merely representative of any desired number of voltage actuated switches and loads.

The numeral 23 denotes a terminal which can be connected to a second source of power; and a normally-open switch 25 can connect that terminal to the left-hand terminal of the capacitor 18. The switch 25 can be closed by a trigger, not shown, under the control of the operator of the control system.

The resistors 12, 22 and 24 can have various values, but the ohmic value of the resistor 24 should be larger than the ohmic value of the resistor 22. Also, the ohmic value of the resistor 22 should be larger than the ohmic value of the resistor 12.

Whenever the terminal 10 is connected to the first source of power, current will flow from that terminal via resistor 12, diode 14, junction 16, capacitor 18, junction 20, and resistor 22 to ground; and that current flow will charge the capacitor 18 up to the voltage of that first source of power. That voltage will be close to, but will be lower than, the voltage needed to actuate any of the voltage actuated switches 26, 30, 34, 37 and 39. As a result, the connecting of the terminal 10 to the first source of power will not actuate any of those voltage actuated switches. Current also will flow from the terminal 10 via resistor 12, diode 14, junction 16, and resistor 24 to ground.

The first source of power has sufficient power-supplying capability to actuate the load 28, the load 32, the load 36, the load 43 or the load 45. However, because the voltage actuated switch 26 and the load 28 are connected in series, and because the voltage supplied by that source of power is lower than the voltage required to actuate the voltage actuated switch 26, that source of power will be unable to actuate the load 28 as long as the voltage actuated switch 26 remains in its normal, high impedance state.

When the switch 25 is closed, the voltage at the terminal 23 will add to the voltage across the capacitor 18; and the total of those voltages will be higher than the breakdown voltage of the voltage actuated switch 26. That total voltage will back-bias the diode 14 and will actuate the voltage actuated switch 26; and, as that voltage actuated switch is actuated, the impedance thereof will fall to a low level. Thereupon, current will flow from the right-hand terminal of the capacitor 18 via junction 16, the actuated voltage actuated switch 26, junction 27, load 28, parallel-connected resistor 22 and the second source of power, and junction 20 to the left-hand terminal of that capacitor. When the voltage at the junction 16 falls below the level of the voltage at the terminal 10, as the voltage actuated switch 26 is being actuated, the diode 14 will unblock and will enable the first source of power to cause current to flow from terminal 10 via resistor 12, diode 14, junction 16, voltage actuated switch 26, junction 27, and load 28 to ground. The combined current flowing through the load 28 will quickly actuate that load, and will enable that load to experience an irreversible change from a low impedance state to a high impedance state. Current also will flow from the right-hand terminal of capacitor 18 via junction 16, resistor 24, parallel-connected resistor 22 and the second source of power, and junction 20 to the left-hand terminal of that capacitor, but the resistance of the resistor 24 will be large enough to materially limit such current flow. Current will tend to flow from the right-hand terminal of the capacitor 18 via junction 16, the actuated voltage actuated switch 26, junction 27, the voltage actuated switch 30, junction 31, load 32, parallel-connected resistor 22 and the second source of power, and junction 20 to the left-hand terminal of that capacitor; but the normal impedance of the voltage actuated switch 30 is so high that it will substantially block such current flow.

The actuation of the load 28 will dissipate some of the energy stored within the capacitor 18; and hence the voltage across that capacitor will drop. If each closure of the switch 25 should actuate just one of the loads 28, 32, 36, 43 and 45, the capacitance of the capacitor 18, the resistance of the resistor 22, the impedance of the second source of power, the impedance of the voltage actuated switch that is to be actuated, and the impedance of the load that is to be actuated will be selected to provide a time constant which will reduce the voltage across the capacitor 18, as the load is actuated, to a value which will make the voltage at the junction 16 lower than the voltage required to actuate the next-succeeding voltage actuated switch. If the switch 25 is then opened before the voltage at the junction 16 can rise to a value which exceeds the breakdown voltage of the next-succeeding voltage actuated switch, that next-succeeding voltage actuated switch will not be actuated.

The drop in voltage at the junction 16, as the load is actuated, will unblock the diode 14; and, thereupon, current will flow from the terminal 10 via resistor 12, diode 14, junction 16, capacitor 18, junction 20 and resistor 22 to ground. The resulting flow of current through the capacitor 18, after the load has changed from a low impedance to a high impedance, will again charge that capacitor up to a value close to the value of the voltage applied to the terminal 10 by the first source of power. While that voltage will be too low to actuate the voltage actuated switch 30, it will enable a further actuation of the switch 25 to again provide a total voltage that will actuate that voltage actuated switch. Current also will flow from terminal 10 via resistor 12, diode 14, junction 16, and resistor 24 to ground.

With this arrangement, each closure of the switch 25 will actuate just one of the loads 28, 32, 36, 43 and 45. The time intervals between successive actuations of the loads 28, 32, 36, 43 and 45 can be as long or as short as the operator of the control system desires—being determined by the lengths of time during which the switch 25 is closed plus the time intervals between actuations of that switch.

If each closure of the switch 25 should actuate two of the loads 28, 32, 36, 43 and 45, the capacitance of the capacitor 18, the resistance of the resistor 22, the impedance of the second source of power, the impedance of the two voltage actuated switches are that are to be actuated, and the impedances of the two loads that are to be actuated will be selected to provide a time constant which will reduce the voltage across the capacitor 18, as the two loads are successively actuated, to a value which will make the voltage at the junction 16 lower than the voltage required to actuate the next succeeding voltage actuated switch. The drop in voltage at the junction 16, as the second voltage actuated switch or the second lead is actuated, will unblock the diode 14; and, thereupon, current will flow from the terminal 10 via resistor 12, diode 14, junction 16, capacitor 18, junction 20 and resistor 22 to ground. The resulting flow of current through the capacitor 18 will again charge that capacitor up to the value of the voltage applied to the terminal 10 by the first source of power. While that voltage will be too low to actuate the third voltage actuated switch, it will enable a further actuation of the switch 25 to again provide a total voltage that will actuate that third voltage actuated switch. Current also will flow from terminal 10 via resistor 12, diode 14, junction 16, and resistor 24 to ground.

The only power that the second source of power must supply is the small amount of power represented by the voltage pulses which are added to the voltage across the capacitor 18 to actuate the voltage actuated switches; because the power stored within that capacitor and the power supplied by the first source of power will initiate and complete the actuations of the loads. As a result, the second source of power can be a low energy source of power. In one preferred embodiment of the control system provided by the present invention, the second source of power was able to use less than one hundred milliwatts to initiate the firing of loads which required in excess of ten watts to actuate them.

The only power that the control system of FIG. 1 consumes, in its steady-state condition, is the power due to the leakage current through capacitor 18, to the leakage current through the voltage actuated switches, and to the current through resistor 24. Those currents will be quite small, and hence the control system of the present invention will consume very little power in its steady-state condition.

The resistor 24 provides a current path for current flowing through the diode 14 whenever the capacitor 18 is fully charged, and thus normally keeps that diode conductive. The resistor 24 also constitutes a by-pass to ground for any electrical "noise" which is applied to the terminal 10 or to the terminal 23, and will thus keep any such noise from actuating any of the voltage actuated switches.

The capacitor 18 of FIG. 1 is desirable, because it enables relatively small amplitude voltage pulses, from the second source of power to which the terminal 23 is connected, to add to the voltage across that capacitor to develop total voltages which will exceed the breakdown voltage of any of the voltage actuated switches 26, 30, 34, 37 and 39. However, where the closing of the switch 25 will apply a voltage to the junction 20 that will exceed the breakdown voltage of any of the voltage actuated switches 26, 30, 34, 37 and 39, the capacitor 18 of FIG. 1 can be replaced by a relatively large resistor, a diode, or other electrical component which will provide sufficient impedance to current flowing from terminal 10 via resistor 12 and diode 14 to the junction 16 to force enough of that current to flow through an actuated voltage actuated switch to promptly actuate the load connected in series with that voltage actuated switch. Where such a resistor, diode or other electrical component is used, the ohmic value of the resistor 22 will preferably be higher than the ohmic value of that resistor where the capacitor 18 is used.

In FIG. 2, a multivibrator 40 is interposed between the terminal 23 and the anode of a diode 47, and the cathode of that diode is connected to the junction 16. The normally-open switch 25 is connected between the "set" terminal of that multivibrator and a terminal 38 which is connected to a source of triggering voltage. The multivibrator 40 can be of standard and usual form; but the components thereof will be dimensioned to provide a voltage pulse which has an amplitude that exceeds the breakdown voltage of any of the voltage actuated switches 26, 30, 34, 37 and 39 and which has a duration that will enable that voltage pulse to actuate just a predetermined number of voltage actuated switches. For example, if the control system of FIG. 2 is intended to actuate just one of the loads 28, 32, 36, 43 and 45 on each actuation of the switch 25, the components of the multi-vibrator 40 will be dimensioned to provide a voltage pulse that has a duration which is long enough to cause that voltage pulse to actuate the voltage actuated switch 26 but is short enough so the voltage at the junction 16, after the load 28 associated with that voltage actuated switch has become actuated, will be below the level of voltage required to actuate the next-succeeding voltage actuated switch 30. If the control system of FIG. 2 is intended to actuate two of the loads 28, 32, 36, 43 and 45 each actuation of the switch 25, the components of the multivibrator 40 will be dimensioned to provide a voltage pulse that has a duration which is long enough to cause that voltage pulse to actuate the voltage-actuated switches 26 and 30 but is short enough so the voltage at the junction 16, after the load 32 has become actuated, will be below the level of voltage required to actuate the next-succeeding voltage actuated switch 34.

By using the multivibrator 40, the control system of FIG. 2 makes it possible to apply voltage pulses, having amplitudes greater than the breakdown voltages of any of the voltage actuated switches 26, 30, 34, 37 and 39, without any risk of a voltage pulse actuating more than the desired number of voltage actuated switches; because each voltage pulse from that multivibrator will be terminated before the load or loads, whose actuation was to be triggered by that voltage pulse, have been fully actuated.

If desired, a capacitor 18 could be substituted for the diode 47 in FIG. 2; and, in that event, the amplitude of each voltage pulse supplied by the multivibrator 40 could be smaller than the breakdown voltage of any of the voltage actuated switches 26, 30, 34, 37 and 39. The multivibrator 40 would then make it possible to store large amounts of energy in the capacitor 18, without any risk of a voltage pulse actuating more than the desired number of voltage actuated switches; because the normal voltage across that capacitor would be too low to actuate the next-succeeding voltage actuated switch and because the voltage pulse from that multivibrator would be terminated before the load or loads, whose actuation was to be triggered by that voltage pulse, had been fully actuated. The storing of large amounts of energy within the capacitor 18 would be desirable because it would minimize the recharging of that capacitor during any given series of actuations of the loads 28, 32, 36, 43 and 45.

Where the multivibrator 40 is a monostable multivibrator, that multivibrator and the diode 47 will apply just one positive-going voltage pulse to the junction 16 for each actuation of switch 25. However, if desired, the multivibrator 40 could be a multivibrator that was free-running whenever the switch 25 was closed but that would re-set itself when that switch was re-opened. Such a multivibrator and the diode 47 would apply a succession of timed positive-going pulses to the junction 16 as long as the switch 25 was closed. The components of any such multivibrator should be dimensioned to make the time intervals between the successive positive-going pulses, that are applied to the junction 16, long enough to permit full actuation of the load or loads that are to be actuated as a result of each positive-going pulse. The use of such a multivibrator enables the control system of FIG. 2 to provide a succession of precisely-timed, positive-going pulses to the junction 16 while the switch 25 is held closed, but enables re-opening of that switch to prevent the supplying of any further such pulses to that junction.

If a high impedance voltage pulse generator is used in lieu of the multivibrator 40, the resistor 22 and the diode 47 of FIG. 2 can be deleted. In that event, the output terminal of that voltage pulse generator will be connected directly to the junction 16; and the high impedance of that voltage pulse generator will force enough of the current, flowing from terminal 10 via resistor 12 and diode 14 to the junction 16, to flow through the unactuated load closest to the junction 16 to actuate that load.

Whether the control system of FIG. 2 utilizes the multivibrator 40 and the diode 47, the multivibrator 40 and a capacitor 18, or a voltage pulse generator to effect the successive actuations of the voltage actuated switches 26, 30, 34, 37 and 39, the second source of power will supply only a limited amount of power. The only power that the second source of power must supply is the small amount of power that is needed to actuate the voltage actuated switches; because the first source of power will supply the power needed to initiate and complete the actuations of the loads.

In FIG. 3, a multivibrator 60 is interposed between the terminal 23 and the left-hand terminal of the capacitor 18; and the normally-open switch 25 is conencted between the "set" terminal of that multivibrator and a terminal 58 which is connected to a source of triggering voltage. A transformer 42 has the primary winding 44 thereof connected in parallel with the resistor 12; and the upper terminal of the secondary winding 46 of that transformer is connected to the "re-set" terminal of that multivibrator by a resistor 50 and a junction 52. A resistor 54 is connected between the junction 52 and ground; and a diode 48 is connected across the secondary winding 46. The multivibrator 60 can be of standard and usual form; but the components thereof will be dimensioned to provide a voltage pulse of an amplitude and duration which will enable that voltage pulse to help actuate any of the voltage actuated switches.

If desired, the capacitor 18 of FIG. 3 could be replaced by a relatively large resistor, a diode, or other electrical component which would provide sufficient impedance to current flowing from terminal 10 via resistor 12 and diode 14 to the junction 16 to force enough to that current to flow through an actuated voltage actuated switch. Where that capacitor is replaced, the value of each voltage pulse supplied by the multivibrator 60 must be larger than the breakdown voltage of each of the voltage actuated switches.

As the voltage actuated switch 26 irreversibly becomes a relatively low impedance, current will flow from terminal 10 via resistor 12, diode 14, junction 16, voltage actuated switch 26, junction 27, and load 28 to ground; and a current pulse will develop in the resistor 12 and in the primary winding 44 of the transformer 42. That current pulse will develop a voltage across the secondary winding 46 of that transformer; and that voltage will make the upper terminal of that secondary winding negative—thereby applying a negative voltage to the "re-set" terminal of the multivibrator 60. That multivibrator will respond to that negative voltage at the "re-set' terminal thereof to terminate the voltage pulse which the output terminal of that multivibrator was applying to the left-hand terminal of the capacitor 18. Thereupon, the voltage at the junction 16 will be too low to enable that voltage to actuate the voltage actuated switch 30 after the load 28 has been fully actuated.

The multivibrator 60 will remain in its "re-set" condition, and the voltage at the junction 16 will be the voltage across the capacitor 18, until the switch 25 is again closed to apply a further triggering voltage from the terminal 58 to the "set" terminal of that multivibrator. Thereupon, that multivibrator will apply a further voltage pulse to the left-hand terminal of the capacitor 18, and thereby help actuate the voltage actuated switch 30. As that voltage actuated switch becomes actuated, the energy from the capacitor 18 and from the first source of power will actuate the load 32. The current pulse that will develop in the secondary winding 46 will cause another negative voltage to be applied to the "re-set" terminal of the multivibrator 60; and that multivibrator will respond to that negative voltage to terminate the voltage pulse which the output terminal of that multivibrator was applying to the left-hand terminal of the capacitor 18. Thereupon, the voltage at the junction 16 will again be too low to enable that voltage to help actuate the voltage actuated switch 34 after the load 32 has been fully actuated.

Any tendency of the distributed capacities in the secondary winding 46 and in the leads connected thereto to coact with the inductance of that secondary winding to make the upper terminal of that secondary winding positive and the lower terminal of that secondary winding negative will be compensated for by the diode 48. Specifically, if the voltage at the upper terminal of the secondary winding 46 ever tended to exceed the voltage at the bottom of that secondary winding by more than about one-half of a volt, the diode 48 would become conductive and would serve as a low impedance path to discharge that voltage.

If, because of a "blown" fuse or an opened circuit breaker, the first source of power is disconnected from the terminal 10, no changes will occur in the condition of any of the voltage actuated switches 26, 30, 34, 37 and 39 and no changes will occur in the condition of any of the loads 28, 32, 36, 43 and 45 while that power source is disconnected. This is important, because it will enable the control system to continue the sequential actuation of the loads in the proper order when that first source is again connected to the terminal 10. For example, if the first source of power is disconnected from the terminal 10 after the voltage actuated switches 26, 30 and 34 and the loads 28, 32 and 36 have been actuated, the reconnecting of that first source of power to that terminal will enable the application of a voltage pulse to the left-hand terminal of the recharged capacitor 18 to help actuate the voltage actuated switch 37—with a consequent actuation of the load 43.

Each of the embodiments of control system provided by the present invention can thus initiate the sequential actuation of a plurality of loads, enable a small amount of energy to initiate the actuation of a plurality of loads that require appreciable amounts of power to actuate them, provide varying amount of time between the actuations of the sequentially-actuated loads, and actuate the next-succeeding load if the power to that control system is restored after that power has been "off" for an indefinite length of time. As a result, the control system of the present invention enables the operator thereof to fire a number of pyrotechnic devices sequentially with appropriately timed intervals between each firing or each group of firing.

Whereas the drawing and accompanying description have shown and described three preferred embodiments of the present invention, it should be apparent to those skilled in the art that various changes may be made in the form of the invention without affecting the scope thereof.

What we claim is:

1. A control system that can sequentially actuate a plurality of loads and that comprises:
   a plurality of voltage actuated switches,
   each of said voltage actuated switches normally having a relatively high impedance but responding to a predetermined voltage to become actuated and thereby irreversibly change to a relatively low impedance,
   an energy-storing element,
   said voltage actuated switches being connected in series with each other and said series-connected voltage actuated switches being connected to one terminal of said energy-storing element,
   a plurality of loads,
   each of said loads normally having a low impedance but responding to a predetermined current flowing therethrough to become actuated and thereby irreversibly change to a high impedance.
   said loads being connected to said voltage actuated switches so any given load of said plurality of loads has at least one voltage actuated switch interposed between it and said one terminal of said energy-storing element,
   said one voltage actuated switch initially acting to substantially keep current from flowing through said given load, but responding to the actuation thereof to permit current to flow through said given load,
   said energy-storing element normally having a voltage thereacross which is lower than said predetermined voltage, and
   means adapted to add a voltage to said voltage across said energy-storing element to develop a total voltage which exceeds said predetermined voltage,
   said total voltage acting to actuate the unactuated voltage actuated switch which is closest to said one terminal of said energy-storing element, thereby causing said voltage actuated switch to irreversibly change from a relatively high impedance to a relatively low impedance, and thereby enabling said predetermined current to flow through the unactuated load which is closest to said voltage actuated switch,
   said unactuated load responding to said predetermined current to become actuated and thereby irreversibly change from a low impedance to a high impedance,
   said means being adapted to add a second voltage to said voltage across said energy-storing element to develop a second total voltage which exceeds said predetermined voltage, said second total voltage acting to actuate the unactuated voltage actuated switch which is closest to said one terminal of said energy-storing element, thereby causing said voltage actuated switch to irreversibly change from a relatively high impedance to a relatively low impedance, and thereby enabling said predetermined current to flow through the unactuated load which is closest to said voltage actuated switch, said unactuated load responding to said predetermined current to become actuated and thereby irreversibly change from a low impedance to a high impedance.

2. A control system as claimed in claim 1 wherein said means includes a terminal which is connectable to a source of power and also includes an actuatable element which normally isolates said terminal from said energy-storing element, said actuatable element being actuatable to enable said means to add said voltage and said second voltage to said voltage across said energy-storing element and thereby develop said total voltage and said second total voltage.

3. A control system as claimed in claim 1 wherein said means includes a terminal which is connectable to a source of power and also includes a pulse-forming device, said pulse-forming device being actuatable to apply pulses to said energy-storing element and thereby enable said means to add said voltage and said second voltage to said voltage across said energy-storing element and thereby develop said total voltage and said second total voltage, each of said pulses being long enough in duration to actuate a predetermined number of said voltage actuated switches but being short enough in duration not to actuate further of said voltage actuated switches.

4. A control system as claimed in claim 1 wherein said means includes a terminal which is connectable to a source of power and also includes a monostable element which normally isolates said terminal from said energy-storing element, said monostable element being actuatable to enable said means to add said voltage and said second voltage to said voltage across said energy-storing element and thereby develop said total voltage and said second total voltage.

5. A control system as claimed in claim 1 wherein said means includes a terminal which is connectable to a source of power and also includes a pulse-forming device, said pulse-forming device being actuatable to apply pulses to said energy-storing element and thereby enable said means to add said voltage and said second voltage to said voltage across said energy-storing element and thereby develop said total voltage and said second total voltage, said means also including a pulse-terminating sub-circuit that can coact with said pulse-forming device to terminate the pulses provided by said pulse-forming device, said pulse-terminating sub-circuit acting after the actuation of a voltage actuated switch but before the completion of the actuation of the load associated with said voltage actuated switch to terminate the pulse which actuated said voltage actuated switch.

6. A control system as claimed in claim 1 wherein said means includes a terminal which is connectable to a source of power and also includes a pulse-forming device, said pulse-forming device being actuatable to apply pulses to said energy-storing element and thereby enable said means to add said voltage and said second voltage to said voltage across said energy-storing element and thereby develop said total voltage and said second total voltage, said pulse-forming device being a bistable element, said means also including a pulse-terminating sub-circuit that is connected to the re-set terminal of said bistable element, said pulse-terminating sub-circuit being adapted to apply signals to said re-set terminal of said bistable element which will re-set said bistable element, said pulse-terminating sub-circuit acting after the actuation of a voltage actuated switch but before the completion of the actuation of the load associated with said voltage actuated switch to apply a signal to said re-set terminal of said bistable element which will re-set said bistable element and thereby terminate the pulse which actuated said voltage actuated switch.

7. A control system as claimed in claim 1 wherein said means includes a terminal which is connectable to a source of power, said energy-storing element being adapted to store sufficient energy therein to enable said source of power to actuate voltage actuated switches which the energy supplied by said source of power could not, by itself, actuate.

8. A control system as claimed in claim 1 wherein said energy-storing element is a capacitor, and wherein a charging sub-circuit develops and normally maintains said voltage across said capacitor.

9. A control system as claimed in claim 1 wherein said energy-storing element is a capacitor, and wherein a charging sub-circut develops and normally maintains said voltage across said capacitor, said charging sub-circuit including a diode that will respond to said voltage or said second voltage to become back-biased, and thereby isolate part of said charging sub-circuit from said capacitor.

10. A control system as claimed in claim 1 wherein said energy-storing element is a capacitor, and wherein a charging sub-circuit develops and normally maintains said voltage across said capacitor, said charging sub-circuit being connected to a further source of power, said further source of power and said capacitor supplying the major portion of the energy needed to actuate said voltage actuated switches and said loads.

11. A control system that can sequentially actuate a plurality of loads and that comprises:
a terminal that is connectable to a source of power,
a capacitor,
a resistor,
a series-connected load and voltage actuated switch,
at least one additional series-connected load and voltage actuated switch, and
a second terminal that is connected to a second source of power,
the first said terminal and said resistor connecting said capacitor across the first said source of power to charge said capacitor and thereby develop a predetermined voltage across said capacitor,
each of said voltage actuated switches normally having a relatively high impedance but responding to a second predetermined voltage, which is higher than the first said predetermined voltage, to become actuated and thereby irreversibly change to a relatively low impedance,
each of said loads normally having a low impedance but responding to a predetermined current flowing therethrough to become actuated and thereby irreversibly change to a high impedance,
the first said series-connected load and voltage actuated switch being connected to one terminal of said capacitor,
the voltage actuated switch of said one additional series-connected load and voltage actuated switch normally being isolated from said one terminal of said capacitor by the voltage actuated switch of the first said series-connected load and voltage actuated switch,
said second terminal and said second source of power being adapted to apply a pulse of voltage to said capacitor that will add to the first said predetermined voltage, developed across said capacitor by the first said source of power, to provide a total voltage that is higher than said second predetermined voltage,
the voltage actuated switch of the first said series-connected load and voltage actuated switch responding to said total voltage to become actuated and thereby irreversibly change from a relatively high impedance to a relatively low impedance,
said voltage actuated switch of the first said series-connected load and voltage actuated switch thereupon permitting said predetermined current to flow through the load of the first said series-connected load and voltage actuated switch to actuate said load and thereby irreversibly change said load from a relatively low impedance to a high impedance, said pulse of voltage being long enough in duration to actuate a predetermined number of said voltage actuated switches but being short enough in duration not to actuate further of said voltage actuated switches, said second terminal and said second source of power being adapted to apply a second pulse of voltage to said capacitor that will add to the first said predetermined voltage, developed across said capacitor by the first said source of power, to provide a second total voltage that is higher than said second predetermined voltage, the voltage actuated switch of the next-succeeding series-connected load and voltage actuated switch responding to said second total voltage to become actuated and thereby irreversibly change from a relatively high impedance to a relatively low impedance, said voltage actuated switch of said next-succeeding series-connected load and voltage actuated switch thereupon permitting said predetermined current to flow through the load of said next-succeeding series-connected load and voltage actuated switch to actuate said load and thereby irreversibly change said load from a relatively low impedance to a relatively high impedance.

12. A control system as claimed in claim 11 wherein the first said terminal and the first said source of power are connected to said one terminal of said capacitor and said resistor is connected to the opposite terminal of said capacitor, and wherein said second terminal and said second source of power are connected to said opposite terminal of said capacitor.

13. A control system as claimed in claim 11 wherein an actuatable element is interposed between said second terminal and said capacitor, said actuatable element normally isolating said capacitor from said second terminal and said second source of power but being adapted to connect said capacitor to said second terminal and said second source of power to apply said pulse of voltage to said capacitor.

14. A control system as claimed in claim 11 wherein a diode is connected between said one terminal and said one terminal of said capacitor, said diode responding to said pulse of voltage and said second pulse of voltage to become back-biased, said diode subsequently responding to a reduction in the voltage at said one terminal of said capacitor to become forward-biased.

15. A control system as claimed in claim 11 wherein said predetermined number of said voltage actuated switches is one, whereby the first said pulse of voltage will actuate only one of said voltage actuated switches.

16. A control system as claimed in claim 11 wherein the time interval between the application of the first said pulse of voltage and the application of said second pulse of voltage is variable.

17. A control system as claimed in claim 11 wherein a pulse-forming device is interposed between said second terminal and said capacitor to selectively provide said pulse of voltage and said second pulse of voltage.

18. A control system as claimed in claim 11 wherein a diode is connected between said one terminal and said one terminal of said capacitor, and wherein a second resistor is connected to said one terminal of said capacitor to normally keep said diode conductive whenever said capacitor is fully charged.

19. A control system as claimed in claim 11 wherein a diode is connected between said one terminal and said one terminal of said capacitor, and wherein a second resistor is connected to said one terminal of said capacitor to normally keep said diode conductive whenever said capacitor is fully charged, the first said resistor being connected to the opposite terminal of said capacitor, whereby current flows through said diode and the first said and said second resistors during the charging of said capacitor and flows through said diode and said second resistor when said capacitor is fully charged.

20. A control system that can sequentially actuate a plurality of voltage actuated switches and that comprises:
a plurality of voltage actuated switches,
each of said voltage actuated switches normally having a relatively high impedance but responding to a predetermined voltage to become actuated and thereby irreversibly change to a relatively low impedance,
an energy-storing element,
said voltage actuated switches being connected in series with each other and said series-connected voltage actuated switches being connected to one terminal of said energy-storing element,
said energy-storing element having a voltage thereacross which is lower than said predetermined voltage, and
means adapted to add a voltage to said voltage across said energy-storing element to develop a total voltage which exceeds said predetermined voltage,
said total voltage acting to actuate the unactuated voltage actuated switch which is closest to said one terminal of said energy-storing element, thereby enabling said voltage actuated switch to irreversibly change from a relatively high impedance to a relatively low impedance,
said means being adapted to add a second voltage to said voltage across said energy-storing element to develop a second total voltage which exceeds said predetermined voltage,
said second total voltage acting to actuate the unactuated voltage actuated switch which is closest to said one terminal of said energy-storing element, thereby enabling said voltage actuated switch to irreversibly change from a relatively high impedance to a relatively low impedance.

21. A control system as claimed in claim 20 wherein said means includes a terminal which is connectable to a source of power and also includes an actuatable element which normally isolates said terminal from said energy-storing element, said actuatable element being actuatable to enable said means to add said voltage and said second voltage to said voltage across said energy-storing element and thereby develop said total voltage and said second total voltage.

22. A control system as claimed in claim 20 wherein said energy-storing element is a capacitor, and wherein a charging sub-circuit develops and normally maintains said voltage across said capacitor.

23. A control system that can initiate sequential actuation of a plurality of loads and that comprises:
a plurality of voltage actuated switches,
each of said voltage actuated switches normally having a relatively high impedance, but responding to a predetermined voltage to become actuated and thereby irreversibly change to a relatively low impedance,
said voltage actuated switches being connected in series with each other and said series-connected voltage actuated switches being connected to a terminal,
a plurality of loads,
each of said loads normally having a low impedance, but responding to a predetermined current flowing therethrough to become actuated and thereby irreversibly change to a high impedance,
said loads being connected to said voltage actuated switches so any given load of said plurality of loads has at least one voltage actuated switch interposed between it and said terminal,
said one voltage actuated switch initially acting to substantially keep current from flowing through said given load, but responding to the actuation thereof to permit current to flow through said given load, said terminal normally being at a voltage which is lower than said predetermined voltage, and means to apply a voltage to said terminal to make the potential at said terminal exceed said predetermined voltage, said potential at said terminal acting to actuate the unactuated voltage actuated switch which is closest to said terminal, thereby causing said voltage actuated switch to irreversibly change froma relatively high impedance to a relatively low impedance, and thereby enabling said predetermined current to flow through the unactuated load which is closest to said voltage actuated switch, said unactuated load responding to said predetermined current to become actuated and thereby irreversibly change from a low impedance to a high impedance, said means applying a second voltage to said terminal to again make the potential at said terminal exceed said predetermined voltage, said potential at said terminal acting to actuate the unactuated voltage actuated switch which is closest to said terminal, thereby causing said voltage actuated switch to irreversibly change from a relatively high impedance to a relatively low impedance, and thereby enabling said predetermined current to flow through the unactuated load which is closest to said voltage actuated switch, said unactuated load responding to said predetermined current to become actuated and thereby irreversibly change from a low impedance to a high impedance.

24. A control system that can sequentially actuate a plurality of voltage actuated switches and that comprises:

a plurality of voltage actuated switches, each of said voltage actuated switches normally having a relatively high impedance, but responding to a predetermined voltage to become actuated and thereby irreversibly change to a relatively low impedance, said voltage actuated switches being connected in series with each other and said series-connected voltage actuated switches being connected to a terminal, said terminal normally being at a voltage which is lower than said predetermined voltage, and means to apply a voltage to said terminal to make the potential at said terminal exceed said predetermined voltage, said potential at said terminal acting to actuate the unactuated voltage actuated switch which is closest to said terminal, thereby causing said voltage actuated switch to irreversibly change from a relatively high impedance to a relatively low impedance, said means applying a second voltage to said terminal to again make the potential at said terminal exceed said predetermined voltage, said potential at said terminal acting to actuate the unactuated voltage actuated switch which is closest to said terminal, thereby causing said voltage actuated switch to irreversibly change from a relatively high impedance to a relatively low impedance.

25. A control system as claimed in claim 24 wherein a plurality of loads is connected to said terminal so any given load of said plurality of loads has at least one voltage actuated switch interposed between it and said terminal, each of said loads normally having a low impedance, but responding to a predetermined current flowing therethrough to become actuated and thereby irreversibly change to a high impedance, said one voltage actuated switch initially acting to substantially keep current from flowing through said given load, but responding to the actuation thereof to permit current to flow through said given load, and means to apply power to said terminal to cause said predetermined current to flow through said given load after said one voltage actuated switch has been actuated.

26. A control system as claimed in claim 24 wherein a plurality of loads is connected to said terminal so any given load of said plurality of loads has at least one voltage actuated switch interposed between it and said terminal, each of said loads normally having a low impedance, but responding to a predetermined current flowing therethrough to become actuated and thereby irreversibly change to a high impedance, said one voltage actuated switch initially acting to substantially keep current from flowing through said given load, but responding to the actuation thereof to permit current to flow through said given load, means to apply power to said terminal to cause said predetermined current to flow through said given load after said one voltage actuated switch has been actuated, and an electrical element interposed between said terminal and the first said means that has sufficient impedance to cause said predetermined current to flow from said second means and through said given load after said one voltage actuated switch has been actuated.

References Cited

UNITED STATES PATENTS

| 2,909,122 | 10/1959 | Shoemaker et al. | 102—70.2 |
| 3,102,476 | 9/1963 | Naeseth | 102—70.2 X |
| 3,262,388 | 7/1966 | McCarty | 102—18 |

LEE T. HIX, *Primary Examiner.*

J. D. TRAMMELL, *Assistant Examiner.*

U.S. Cl. X.R.

102—70.2; 307—41